Nov. 3, 1959  A. R. LOSSIUS  2,911,250
FLY SWATTER AND PICK UP DEVICE
Filed Feb. 13, 1957
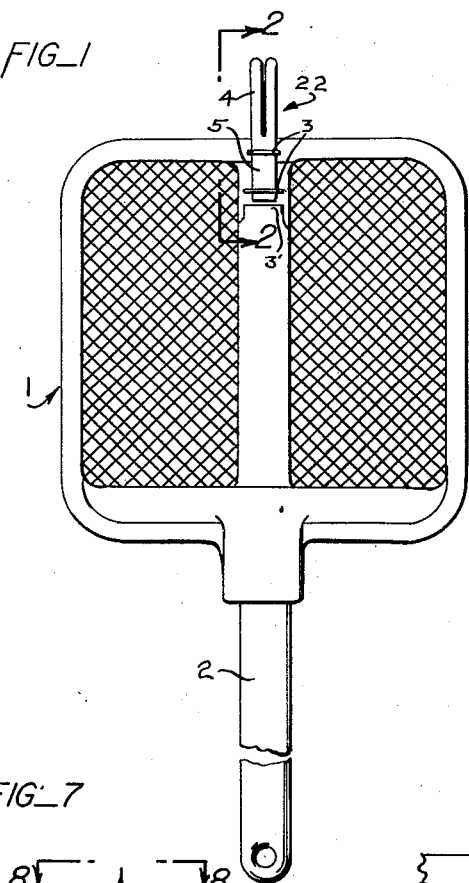
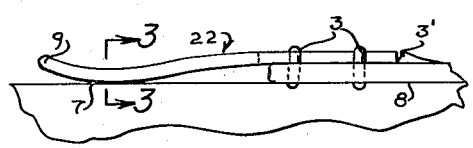
 
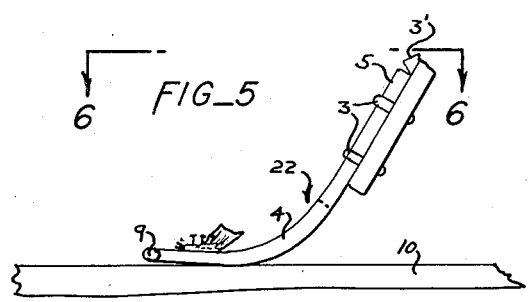
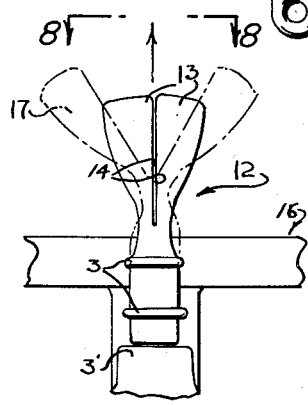
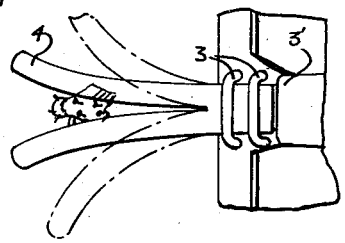
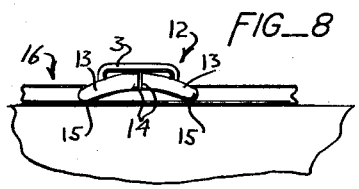
INVENTOR.
ALLAN R. LOSSIUS
BY
*Boyken, Mohler & Wood*
ATTORNEYS

United States Patent Office 2,911,250
Patented Nov. 3, 1959

2,911,250

FLY SWATTER AND PICK UP DEVICE

Allan R. Lossius, San Francisco, Calif.

Application February 13, 1957, Serial No. 640,041

2 Claims. (Cl. 294—99)

This invention relates to fly swatters and has for one of its objects the provision of a fly or insect pick-up element that is adapted to be used for quickly and easily picking up flies or insects that have been killed and from which device the fly or insect that has been picked up is readily released.

Another object of the invention is the provision of a device as above described, that is more readily and more naturally operated than heretofore and that requires the minimum amount of manipulation in the operation of picking up a fly.

A still further object of the invention is the provision of a fly pick-up device on a fly swatter, and which device is economical to make and in no manner impairs the efficiency of the fly swatter for killing flies, and which device is adapted to readily pick up flies or insects of any size from the smallest to the largest.

Heretofore, devices of this general type have been made, but they have required special construction that was relatively expensive and difficult to manipulate, and that were incapable of picking up small flies, and such devices had the further objection of squeezing the flies so hard during the operation of picking them up that the flies would be squashed and would objectionably contaminate the pick up device. In my copending application Serial No. 592,031, I have shown a pick up device that is adapted to satisfactorily pick up flies and the like without the objections hereinbefore mentioned. However, with this latter device, the flies or insects are not as readily seen during the manipulation of the device as with the present invention. With the present invention the flies or insects can be seen during and after the operation, thus enabling the operator to operate the device successfully with the minimum of practice and skill. Furthermore, the present device is more readily cleaned than heretofore should it become contaminated by flies or insects that have been mutilated in the process of killing them.

Other objects and advantages will appear in the description and in the drawings.

In the drawings, Fig. 1 is an elevational view of one side of a conventional fly swatter (the handle being broken in length) showing the fly pick-up device in position thereon;

Fig. 2 is a greatly enlarged edge view of the fly pick-up device of Fig. 1, substantially as seen from line 2—2 of Fig. 1;

Fig. 3 is a greatly enlarged sectional view taken along line 3—3 of Fig. 2;

Fig. 4 is a view similar to that of Fig. 3 but showing a structure having a slightly different cross sectional contour than that of Fig. 3;

Fig. 5 is a view similar to that of Fig. 2, showing the device of Fig. 2 in a position picking up a fly;

Fig. 6 is a view of the device of Fig. 5 as seen from line 6—6 of Fig. 5;

Fig. 7 is a view similar to that of Fig. 6, but showing modification in the structure thereof;

Fig. 8 is a view of the device of Fig. 7 as seen from line 8—8 of Fig. 7.

In detail, the fly swatter, generally designated 1, may be of the conventional type molded from plastic material, or made from woven plastic or metal wire, or of any other suitable construction. Such swatters have an elongated handle 2 attached thereto and projecting from one of the edges thereof.

With the present invention, the fly pick-up device is carried by the body of the fly-swatter and preferably projects from the edge thereof opposite to the edge from which the handle projects. This device is generally indicated at 22 in Fig. 1, and in said figure it is shown as being secured to the fly swatter by staples 3, although it may be cemented to the fly swatter or even made integral therewith if the body of the fly swatter is of suitable material, or secured to the fly swatter in any other suitable manner, and where the fly swatter is made of plastic it may be molded to provide an abutment for the pick-up device as indicated at 3' in Fig. 1.

The operating or operative portion of the pick-up device is substantially that portion that projects from the fly swatter, and said portion is elongated and comprises a pair of fingers 4 that preferably are joined at a point about even with the edge of the fly swatter, the solid case end 5 of the device being the portion that is secured to the fly swatter in the type of device hereon illustrated.

The fingers 4 of the pick-up device preferably have their adjacent surfaces parallel and relatively close together. They may be slightly spaced apart or in engaging relation, but if spaced the spacing is preferably negligible, since the device is intended to operate satisfactorily on the smallest flies.

The fingers 4 are preferably of relatively flexible, elastic rubber or of material having substantially the same characteristics, for it is highly desirable that the flexibility and elasticity be such that the fingers will readily spread apart under slight force (as will later be described more in detail) and will quickly spring back to parallel relationship, or into gripping engagement with a fly, when the spreading force is relieved.

The cross sectional contour of the fingers 4 is best seen in Fig. 3, in which the fingers are of greatest thickness along their opposed surfaces and progressively reduced in thickness in direction away from said surfaces. The general cross sectional form of each finger may be said to be triangular, and as the fingers are preferably identical with each other, their general cross sectional contour of the pair of fingers may be said to be triangular, although the actual contour of each of the fingers shown in Fig. 3 has one convex side, thus resembling the cross sectional contour of a quarter-round molding. Since this contour of each finger may be truly triangular or, trapezoidal, as seen in Fig. 4, the term "generally triangular," where used, is intended to cover the different possible modifications.

One of the corresponding sides or surfaces of the pair of fingers 4 in Fig. 3, or 6 in Fig. 4, are coplanar as indicated at 7 and these planar surfaces face in the same direction as the surface 8 (Fig. 2) of the fly swatter that is opposite to the side thereof to which the pick-up device is secured.

While the fingers may be straight, they may also be formed as seen in Fig. 2 so that the surfaces 7 are substantially coplanar with the surface 8 of the fly swatter, and the outermost ends 9 of the fingers may be slightly curved in direction away from the plane of surfaces 7, 8.

The substantially parallel opposed surfaces of the fingers of the pick up device constitute the fly gripping surfaces. Thus the outermost ends of the fingers may be rounded or even slightly divergent or directed away from each other, if desired, without impairing the efficiency of the fly swatter since the flies are grasped between the opposed fly gripping surfaces.

In the pick up device of the type hereinabove described, a mere downward movement of the fly swatter in an angular position relative to the plane of the floor 10 or other fly supporting surface, and with the fly pick up device leading, will result in the fingers spreading apart as indicated in Fig. 6, upon the fingers engaging said surface. The greater the pressure the wider the fingers will be spread, and with the construction described, the weight of the fly swatter alone is sufficient to spread the fingers to their maximum degree, in which position the edge of the fly swatter from which the device projects will be almost against the floor and the fingers will widely spread from their juncture. In the drawings (Figs. 5, 6) the fingers are only partially spread showing them in a position gripping a very small fly. The device 22 of Fig. 1 is shown as being substantially actual size in the original drawing. The dot-dash lines show the fingers widely spread.

When the fingers are spread, at one side of a fly, the fly swatter may be easily moved so that the fingers are slid along the surface 10 to opposite sides of the fly, and upon lifting the swatter the legs will close on the fly, gripping it between the opposed surfaces of the fingers. A quick shake of the fly swatter is sufficient to effect a release of the fly, so it can be disposed of without difficulty after being carried to any suitable place for its disposal.

The cross sectional contour of the fingers of the pick up device in which they are thickest along their opposed surfaces and then become progressively thinner in direction away from said surfaces, is necessary to the accomplishment of the spreading of the fingers by pressure against the surface 10, without the necessity of sliding the fingers longitudinally thereof on such surface.

In Figs. 7, 8 are illustrated one modification of the invention in which the fly pick up device generally designated 12, is secured to a fly swatter in the same manner as the pick-up device of Fig. 2, and in the same position. This device of Figs. 7, 8 has elongated fingers 13 and opposed, substantially parallel fly gripping surfaces 14. The fingers, however, are of the same thickness in direction transversely of the plane in which the legs are disposed, and said fingers are preferably formed so that they will initially engage the fly supporting surface at points 15 (Fig. 8) spaced from their adjacent edges 14 when the fly swatter 16 that carries the pick up device is generally in the position of the fly swatter shown in Fig. 5.

Under this condition, the fingers 13 will not separate like the fingers 4 (or 6 in Fig. 4) but upon a slight forward movement of the fingers on its supporting surface 10 they will quickly spread to the dot-dash line position 17 of Fig. 7 so as to receive a fly between their gripping edges 14. Preferably, fingers 13 are relatively thin where they join each other, as compared with their width between such juncture and their outer ends so that they will more readily flex when moved to the dot-dash line position of Fig. 7.

In both forms of the invention, the fingers spread apart upon engaging the fly supporting surface and upon being moved toward the fly so that the fly will be positioned between their opposed surfaces, and where the fly swatter is lifted to raise the fly pick up, the fingers of the latter will engage the fly and will hold it between them.

An important feature in the different forms of the invention is the fact that whether the fingers are spread apart merely upon engaging the surface 10 or whether they are spread apart by movement toward the fly after such engagement with said surface, the opposed surfaces of the fingers will gently but firmly grip any sized fly between them at any point between their opposed surfaces from the outer ends of said surfaces to their inner ends.

Preferably the fingers are so constructed that their resistance to flexing at their junctures is not greater than at any point along their lengths. In Figs. 1 to 6 the fingers are of substantially uniform thickness and width from end to end and in Figs. 7, 8 they are of less width at their junctures than at their outer ends, but of the same thickness. The word "thickness" as used herein is the dimension that is perpendicular to the plane in which the fingers are disposed.

The fact that the fingers have the same thickness with their surfaces 7 (Figs. 1 to 5) coplanar, or with the points 15 (Fig. 8) in the same plane will result in the fingers engaging the surface 10 at substantially the same time, which is desirable since the fingers are intended to spread simultaneously.

The substantial engagement of the fingers along their opposed surfaces at the sides 7 of the fingers is quite important. In Figs. 3, 4 the opposed surfaces need not necessarily be in exactly parallel planes to perform satisfactorily as long as they are substantially parallel along their sides 7, which sides engage the surface 10, although their opposed surfaces should not be in widely divergent planes or the desired results of the invention would be lost or impaired.

The fact that the fingers are flexed when the fly swatter is in the angular position relative to the surface 10, as seen in Fig. 5, enables the operator to manipulate the fly pick up device without stooping to an objectionable degree, and the fly and pick up device are at all times clearly visible, thus making the operation easy and certain.

From the foregoing it is seen that the design of the pick up device is adapted to any conventional fly swatter, and in each instance it has the ability to grasp the fly close to the floor at any point along the fingers. Even in the form shown in Fig. 8, the fingers will flatten to engage the floor as soon as pressure is exerted against the floor, and in this view the fingers will spread apart upon sliding them on the floor with their outer ends leading, but they are preferably curved in this form of the invention for best results.

The use of the word "rubber" is intended to cover any material having the characteristics of rubber.

The specific structures shown and described in detail are not intended to be necessarily restrictive of the invention and the claims are intended to cover modifications that come within the scope of the invention.

I claim:

1. A fly pick-up device comprising a pair of elongated, flexible and resilient fingers secured together at one of their ends in side by side relation and disconnected from each other at their opposite ends for flexing apart, said fingers substantially corresponding with each other in shape and size and having opposed substantially parallel fly engaging surfaces along one of their corresponding sides for gripping a fly therebetween after being flexed under tension to opposite sides of such fly, said fingers being relatively thick along their adjacent sides and of progressively reduced thickness in direction away from said sides, and one of the corresponding sides of said pair of fingers being substantially coplanar in a plane substantially parallel with the plane in which said pair of fingers is disposed, whereby said fingers will automatically spread apart upon said corresponding sides being moved into engagement with a fly supporting surface.

2. A fly pick-up device comprising a pair of elongated, flexible fingers in side by side relation, one of their corresponding ends being outer ends and their opposite ends being inner ends, means at said inner ends yieldably holding said fingers in side by side relation with their adjacent surfaces substantially in engagement from said outer ends to said inner ends and said fingers being disconnected from each other from said outer ends to said inner ends for yieldable movement of said fingers apart to divergently extending relation at opposite sides of a fly to be picked up upon said outer ends frictionally engaging a supporting surface on which such fly is adapted to be supported at one side of such fly and moved toward such fly, the substantially engaging adjacent surfaces of said fingers extending, in cross sectional contour, substantially to the sides of said fingers that are adapted to engage said supporting surface, whereby a fly of substantially any size between said adjacent surfaces and on said supporting surface will be frictionally gripped by said fingers upon release of fingers from their divergently extending relation at opposite sides of such fly.

References Cited in the file of this patent

UNITED STATES PATENTS

| | | |
|---|---|---|
| 1,326,577 | Cullen | Dec. 30, 1919 |
| 1,882,291 | Monroe et al. | Oct. 11, 1932 |
| 2,783,515 | Tobias | Mar. 5, 1957 |